G. A. MACBETH.
LAMP LENS.
APPLICATION FILED JAN. 29, 1912.

1,096,114.

Patented May 12, 1914.
2 SHEETS—SHEET 1.

WITNESSES:
Archworth Martin
Harvey L. Lechner

INVENTOR.
George A. Macbeth
BY Paul Synnestvedt
ATTORNEY.

G. A. MACBETH.
LAMP LENS.
APPLICATION FILED JAN. 29, 1912.

1,096,114.

Patented May 12, 1914.

UNITED STATES PATENT OFFICE.

GEORGE A. MACBETH, OF PITTSBURGH, PENNSYLVANIA.

LAMP-LENS.

1,096,114.

Specification of Letters Patent.

Patented May 12, 1914.

Application filed January 29, 1912. Serial No. 674,113.

*To all whom it may concern:*

Be it known that I, GEORGE A. MACBETH, a citizen of the United States, residing at Pittsburgh, in the county of Allegheny and State of Pennsylvania, have invented certain new and useful Improvements in Lamp-Lenses, of which the following is a specification.

The invention relates to lenses for lamps, and it has for its primary objects the provision of a lens of the type wherein the weaker portions of the glass are strengthened, and the provision in such lens having its ridges divided into vertical bands, of means whereby the lens at the joining of the bands is lighted. These, together with such other objects as may hereinafter appear or are incidental to my invention, I attain by means of a construction illustrated in preferred form in the accompanying drawings wherein—

Figure 2:
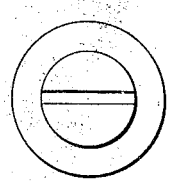
Figure 2 is a plan view of Figure 1 shown in relation with a light diagrammatically indicated.
Figure 2:
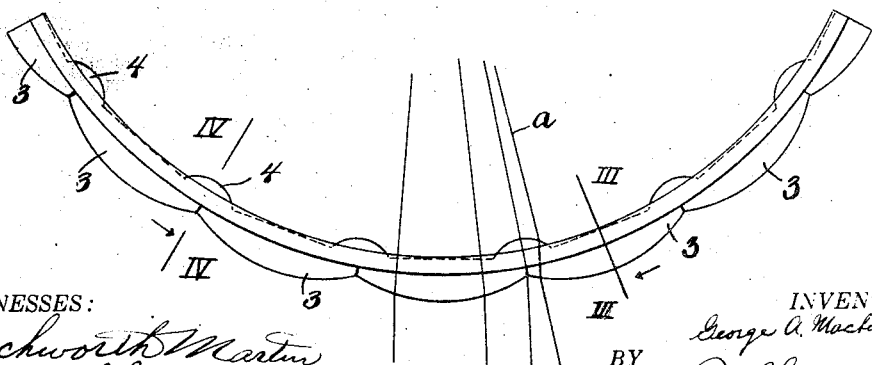
Figure 3:
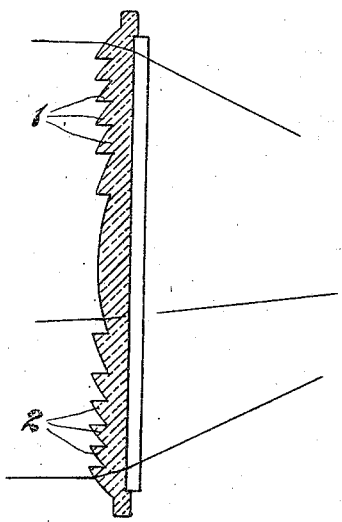
Figures 3 and 4 are sections on the lines III—III and IV—IV of Figure 2.
Figure 4:

On reference to the drawing it will be seen that I have illustrated a lens having a plurality of ridges 1 and 2 which extend across the width of the lens and which are divided vertically into a plurality of bands 3, 3, 3, etc., the ridges being formed on a radius of curvature smaller than that of the lens as an entirety, each ridge constituting in effect a lens itself. The purpose of dividing the ridges into vertical bands is that the visual effect is a broad band extending vertically on the lens, this band being wider than that given by the lens of the ordinary type. In order to better distribute the light I have provided lenticular ribs 4 located on the inner face of the lens substantially adjacent or opposite the weakened portions. By giving to the ribs a lenticular construction the rays of light such as are illustrated by the line *a* in Figure 2 are bent inwardly and serve to lighten up the point of juncture of the vertical bands and also increase the breadth of field of light in each vertical band. Besides adding strength the structure has an additional advantage in that no matter what the angle of vision there will always be seen a band of light.

Figure 1:
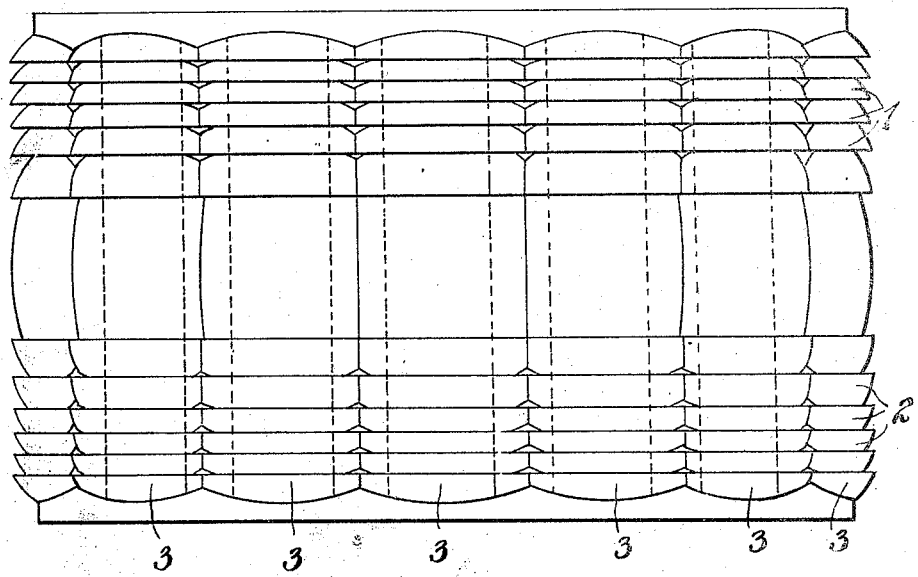
Figure 1 is an elevation of a lens embodying my invention.
Figure 5:
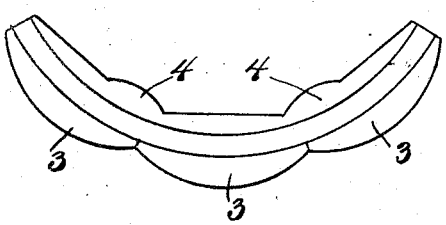
Figure 5 is a plan view of another embodiment of my invention.

It will be obvious that my improved form of lens is applicable to a variety of types of lamps, and in Figure 5 I have illustrated a lens adapted for use on marine lamps for small vessels. This lens is of substantially the same construction as that of Figure 1, but has the lenticular ribs set slightly to one side of the point of juncture of the vertical bands of ridges, in order to concentrate more light in the end sets or bands.

Having thus described my invention and illustrated its use, what I claim as new and desire to secure by Letters Patent, is the following:

1. A curved lens provided with a plurality of substantially horizontal refracting ridges having such ridges divided vertically into sets and being provided with strengthening members adjacent the points of juncture of the sets.

2. A curved lens provided with a plurality of substantially horizontal refracting ridges, having such ridges divided vertically into sets and being provided with lenticular strengthening members adjacent the points of juncture of the sets.

3. A lens provided with a plurality of substantially horizontal rows of convex refracting portions arranged in series one above the other and divided vertically into sets, the lens having ribs located adjacent the dividing lines of the sets.

4. A lens provided with a plurality of substantially horizontal rows of convex refracting portions arranged in series one above the other and divided vertically into sets, the lens having lenticular ribs located adjacent the dividing lines of the sets.

5. A curved lens provided with a plurality of substantially horizontally disposed refracting portions formed on a radius of curvature smaller than that of the lens and divided vertically into sets, the lens being provided with ribs located on its inner surface substantially opposite the dividing lines of the vertical sets.

6. A curved lens provided with a plurality of substantially horizontally disposed refracting portions formed on a radius of curvature smaller than that of the lens and divided vertically into sets, the lens being